US011003346B2

(12) United States Patent
Kim

(10) Patent No.: US 11,003,346 B2
(45) Date of Patent: *May 11, 2021

(54) PROTOTYPE STORING METHOD

(71) Applicant: STUDIO XID KOREA, INC., Seoul (KR)

(72) Inventor: Soo Kim, Hwaseong-si (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,895

(22) Filed: Nov. 13, 2019

(65) Prior Publication Data

US 2020/0081613 A1 Mar. 12, 2020

Related U.S. Application Data

(63) Continuation of application No. 16/352,387, filed on Mar. 13, 2019, now Pat. No. 10,509,557.

(30) Foreign Application Priority Data

May 21, 2018 (KR) .................... 10-2018-0057560

(51) Int. Cl.
G06F 3/0484 (2013.01)
G06F 9/451 (2018.01)
(Continued)

(52) U.S. Cl.
CPC .......... G06F 3/04847 (2013.01); G06F 3/017 (2013.01); G06F 3/0481 (2013.01);
(Continued)

(58) Field of Classification Search
None
See application file for complete search history.

(56) References Cited

U.S. PATENT DOCUMENTS 5,920,725 A * 7/1999 Ma .................... G06F 8/656 717/171
2004/0001092 A1* 1/2004 Rothwein ............ G06F 8/38 715/763

(Continued)

FOREIGN PATENT DOCUMENTS

JP 2005-531083 A 10/2005
JP 2016-197397 A 11/2016

OTHER PUBLICATIONS

A Notice of Allowance mailed by the Japanese Patent Office dated Apr. 7, 2020, which corresponds to Japanese Patent Application No. 2019-040745 and is related to U.S. Appl. No. 16/681,895; with English language translation.

(Continued)

Primary Examiner — Daxin Wu
(74) Attorney, Agent, or Firm — Studebaker & Brackett PC

(57) ABSTRACT

There is provided a prototype storing method. A prototype storing method executed by a computing device, the method includes selecting an inactive layer not assigned an interaction from among a plurality of layers included in a first prototype assigned at least one interaction, determining whether an interaction has been assigned to at least one layer adjacent to the inactive layer and determining the at least one adjacent layer as a merge target if it is determined that no interaction has been assigned to the at least one adjacent layer, generating a new layer by merging the inactive layer and the layer determined as the merge target; and generating a second prototype comprising the new layer instead of the inactive layer and the at least one adjacent layer in response to a user's input to the first prototype.

5 Claims, 12 Drawing Sheets

(51) Int. Cl.
*G06F 8/38* (2018.01)
*G06F 3/01* (2006.01)
*G06F 3/0481* (2013.01)
*G06F 3/0488* (2013.01)

(52) U.S. Cl.
CPC ............ *G06F 3/0488* (2013.01); *G06F 9/451* (2018.02); *G06F 8/38* (2013.01)

(56) References Cited

U.S. PATENT DOCUMENTS

| | | | |
|---|---|---|---|
| 2004/0064808 A1* | 4/2004 | Kira | G06F 8/443 717/154 |
| 2008/0184139 A1* | 7/2008 | Stewart | G06F 9/451 715/762 |
| 2015/0220236 A1* | 8/2015 | Lee | G06F 8/38 715/762 |
| 2016/0259528 A1* | 9/2016 | Foss | G06F 3/0488 |

OTHER PUBLICATIONS

Office Action issued in KR 2018-051336845; mailed by the Korean Intellectual Property Office dated Jul. 30, 2018.

Seunghyun Han; "Prototyping Tool Protopie Review for Designers"; Right Brain lab; Jul. 28, 2018; pp. 1-8; https://web.archive.org/web/20180221022858/http://blog.rightbrain.co.kr/?p=7479.

Principle; "Principle—Documentation"; Jul. 27, 2018; pp. 1-19; https://web.archive.org/web/20180130210918/http://principleformac.com/docs.html.

Charlie Deets; "Framer & Sketch: An Intentional Workflow"; Medium; Jul. 27, 2018; pp. 1-8; https://web.archive.org/web/20170517225342/https://medium.com/facebook-design/framer-sketch-an-intentional-workflow-f91ee2ee1cc1.

* cited by examiner

PROTOTYPE STORING METHOD

The present application is a continuation of U.S. application Ser. No. 16/352,387, filed Mar. 13, 2019, which claims the benefit of Korean Patent Application No. 10-2018-0057560, filed on May 21, 2018, in the Korean Intellectual Property Office. The disclosure of which is incorporated herein by reference in its entirety.

BACKGROUND

1. Field

The present disclosure relates to a method of storing a prototype generated in a prototyping process, and more particularly, to a prototype storing method in which some of a plurality of layers included in a prototype can be merged depending on whether an interaction has been assigned to the layers.

2. Description of the Related Art

Producers of applications installed in user terminals such as smart devices are putting a lot of effort into the design of graphic user interfaces (GUIs) in order to increase user convenience and intuitiveness. They create various GUI prototypes before releasing applications and test the GUI prototypes for convenience and intuitiveness.

Meanwhile, prototypes produced by application producers using a prototyping tool may be uploaded to a specific cloud server. In addition, a prototype stored in the cloud server may be downloaded, and then operations such as tests and follow-up production may be performed on the prototype.

A prototyping tool is a way to define various interactions applied to the design of GUIs. Here, an interaction may be defined as a combination of a trigger that causes a change in, e.g., an object and a response that is the change caused by the trigger and recognizable by a user through a smart device. A defined interaction may be assigned to each layer set by a producer. In this case, a prototype in which numerous layers are set may be produced.

During a prototyping process, a producer creates numerous layers before defining an interaction in each layer. Here, interactions are defined in not all of the generated layers. An important element of the prototyping result is an interaction in which a trigger and a response are defined. However, unnecessary layers not assigned an interaction or objects not assigned an interaction often occupy a large proportion of prototype data stored and uploaded to a cloud server. In other words, meaningless layers not assigned an interaction occupy the unnecessary volume of a prototype.

When a prototype including such unnecessary layers or objects is stored in a computing device, the storage space is wasted. In addition, when a producer uploads or downloads the prototype to or from the cloud server, the data transmission time is greatly increased.

The present disclosure is designed to solve the above problems and to contribute to the improvement of work efficiency of application producers by removing data elements irrelevant to interactions which are a core element of prototype data to be stored or transmitted while maintaining data regarding the interactions.

SUMMARY

Aspects of the present disclosure provide a prototype storing method employed to maintain interactions included in a plurality of layers generated by a prototype producer and to remove the unnecessary volume occupied by layers irrelevant to interactions.

Aspects of the present disclosure also provide a prototype storing method employed to prevent the prototype producer from unintentionally leaving unnecessary layers not assigned an interaction in a prototype.

Aspects of the present disclosure also provide a method of generating a prototype which has a small data volume while maintaining core interactions even when an interaction having a special response for changing the order of layers is assigned.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided selecting an inactive layer not assigned an interaction from among a plurality of layers included in a first prototype assigned at least one interaction, determining whether an interaction has been assigned to at least one layer adjacent to the inactive layer and determining the at least one adjacent layer as a merge target if it is determined that no interaction has been assigned to the at least one adjacent layer, generating a new layer by merging the inactive layer and the layer determined as the merge target; and generating a second prototype comprising the new layer instead of the inactive layer and the at least one adjacent layer in response to a user's input to the first prototype.

According to another aspect of the present disclosure, there is provided A computer program coupled to a computing device and stored in a computer readable recording medium to execute: an operation of selecting an inactive layer not assigned an interaction from among a plurality of layers included in a first prototype assigned at least one interaction, an operation of determining whether an interaction has been assigned to at least one layer adjacent to the inactive layer and determining the at least one adjacent layer as a merge target if it is determined that no interaction has been assigned to the at least one adjacent layer, an operation of generating a new layer by merging the inactive layer and the layer determined as the merge target; and an operation of generating a second prototype comprising the new layer instead of the inactive layer and the at least one adjacent layer in response to a user's input to the first prototype.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
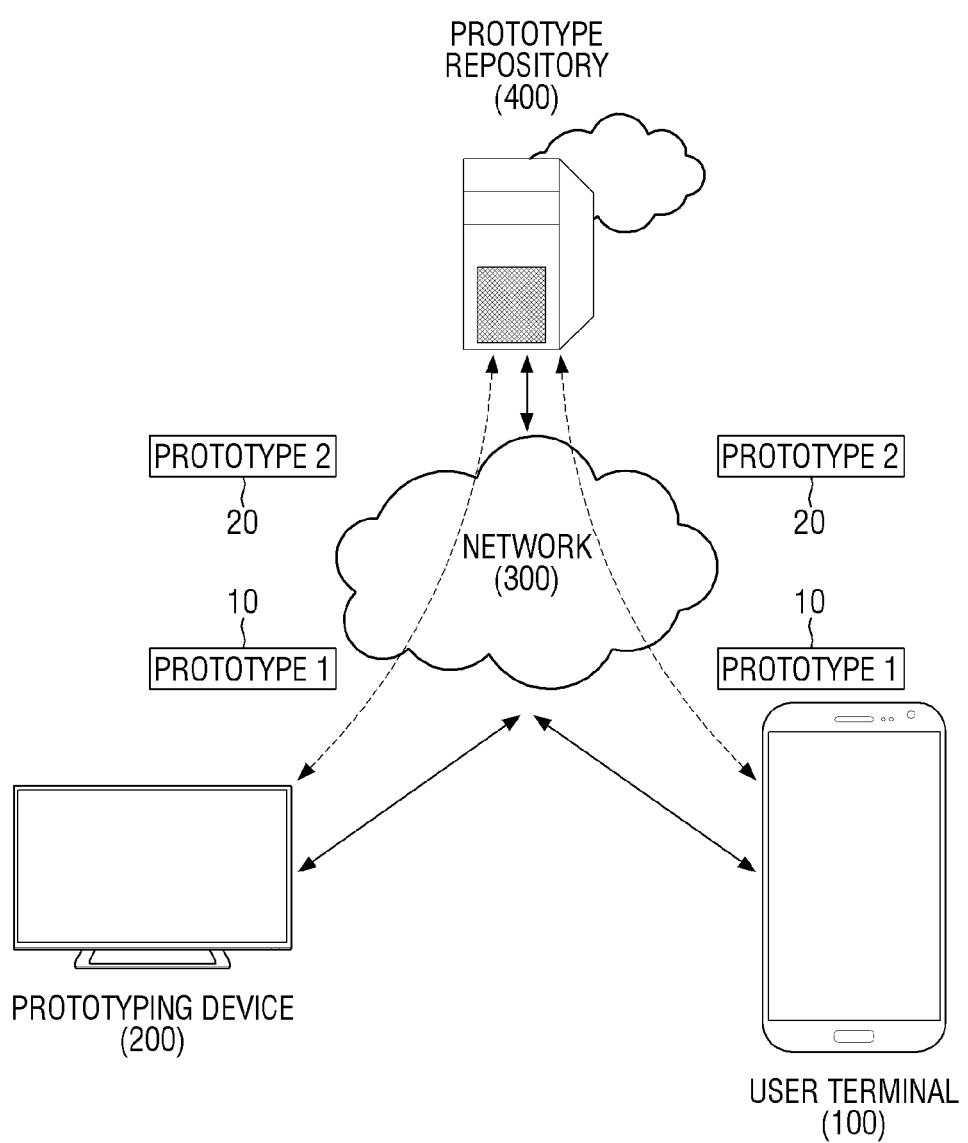
FIG. 1 illustrates the configuration of a prototype clouding system according to an embodiment, in which prototypes can be stored and transmitted.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

An object, as used herein, refers to an object that can be displayed on a prototyping device or a user terminal on which a prototype is implemented. It is an object that forms a graphic user interface (GUI) or an object included in the GUI. For example, the object may be a page that forms a GUI or an image, a moving image, a graphic design element, etc. included in the GUI.

A trigger, as used herein, denotes a condition that causes a prototyping device to generate a specific response. For example, the trigger may be a gesture that a user inputs to a user terminal, information received through, e.g., a sensor provided in the user terminal, or all information generated by the user's actions received through other input media.

Generally, the trigger may be given to an object to generate a response, which may be defined as an interaction. However, it should be noted that the trigger is not necessarily given only to an object, but can also be given to an area other than an object area in a layer area.

A response, as used herein, denotes all types of outputs from a user terminal driven according to a defined interaction when the user terminal receives a trigger. For example, the response may be a change (rotation, movement, transparency) in an object on a display of the user terminal, a sound output, vibrations, etc.

An interaction, as used herein, refers to a defined combination of a trigger given to an object that can be an object of interaction and a response that is a result of action taken in response to the trigger. For example, a touch gesture operation on an object displayed on a user screen may correspond to a trigger, and the movement or enlargement of the object in response to the touch gesture operation may correspond to a response. A combination of the trigger and the response may be defined as an interaction.

A layer, as used herein, denotes a specific area of an object that can be visually output, such as an image or video to which a trigger and a response included in the trigger are applied. For example, an upper part of one image may be defined as an upper layer, a middle part may be defined as a middle layer, and a lower part may be defined as a lower layer. Other specific areas that a user desires to define can also be defined as layers. The layer may be a specific area of an image or video to which a user desires to apply a response.

Hereinafter, embodiments will be described with reference to the attached drawings.

FIG. 1 illustrates the configuration and operation of a prototype clouding system according to an embodiment. However, this is merely an embodiment for achieving the objectives of the present disclosure, and some elements can be added or deleted as needed. In addition, it should be noted that the elements of the prototype clouding system illustrated in FIG. 1 are functionally distinct elements and that one or more elements can be integrated with each other in an actual physical environment. Referring to FIG. 1, the prototype clouding system according to the current embodiment includes a user terminal 100, a prototyping device 200, and a prototype repository 400.

The prototyping device 200 is a computing device such as a tablet, a smartphone, a PC or a notebook in which a user application or a prototyping tool (not illustrated), which is embedded software of the computing device, is installed. A logic relating to a prototype storing method according to embodiments may be performed by the user application or the prototyping tool.

At least any one of a second prototype generated using the prototype storing method according to the embodiments which will be described later and a first prototype which is the original of the second prototype may be stored in the prototyping device 200 or may be transmitted to the prototype repository 400 through a network 300.

The prototype repository 400 is a storage device capable of storing prototypes generated by the prototyping device 200 and is connected to the network 300. A prototype referred to in the current embodiment is data generated by the prototyping tool installed in the prototyping device 200. The prototype is a concept encompassing a first prototype in which all layers generated by a producer in a prototyping process are maintained and a second prototype having a reduced data size as a result of merging some of the generated layers. One or more of the first prototype and the second prototype may be optionally transmitted to the prototype repository 400 according to the setting of the prototyping tool or a user's choice.

The prototype clouding system according to the current embodiment enables works produced by the prototyping tool to be shared and managed on the web. Accordingly, users can share prototypes through specific links and easily manage the prototypes and information according to the development version of the prototypes.

The user terminal 100 is a computing device such as a tablet, a smartphone, a notebook or a PC, and a user interface defined in a prototype generated by the prototyping device 200 may be implemented in the user terminal 100. Although a prototype generated by the prototyping device 200 is implemented as a user interface in the user terminal 100 according to the above description of the prototype clouding system, it should be noted that the user terminal 100 can also serve as the prototyping device 200, and the user interface can also be implemented in the prototyping device 200.

Figure 2:
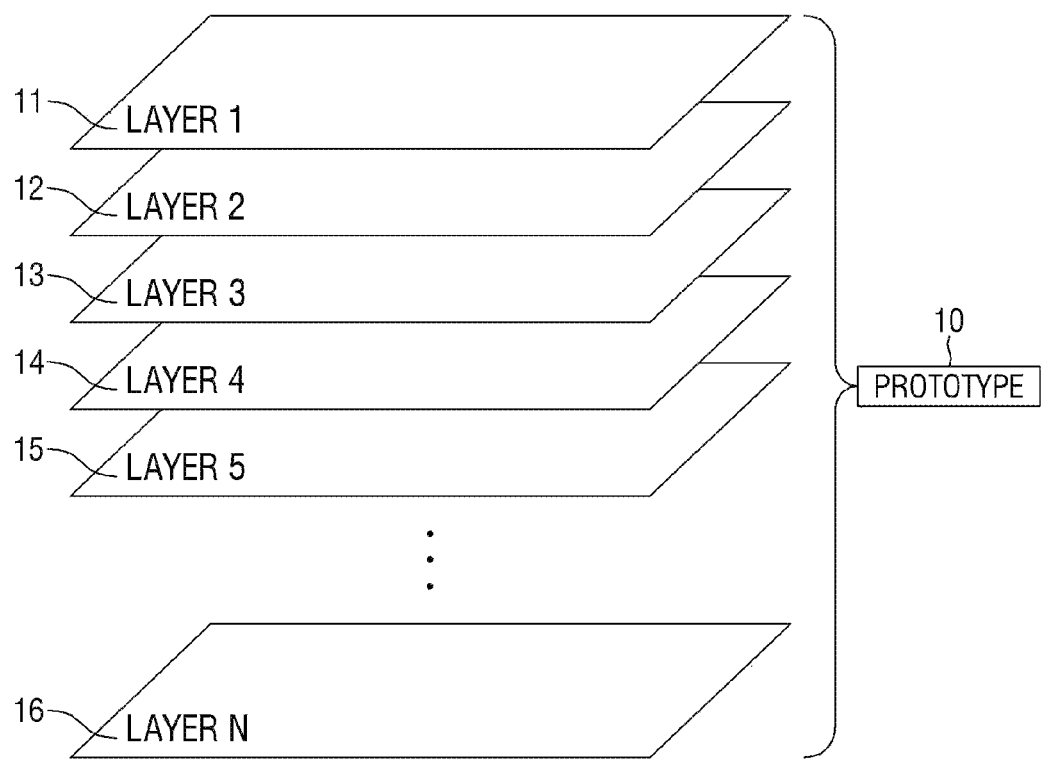
FIG. 2 is a conceptual diagram illustrating a plurality of layers constituting a prototype in order to explain a prototype storing method according to an embodiment.

The configuration and concept of a prototype referred to in the prototype clouding system will now be described in detail with reference to FIG. 2. FIG. 2 is a conceptual diagram illustrating a plurality of layers constituting a prototype in order to explain a prototype storing method according to an embodiment.

Referring to FIG. 2, a prototype 10 may be composed of a plurality of layers including a first layer 11, a second layer 12, a third layer 13, a fourth layer 14, a fifth layer 15, and an $N^{th}$ layer 16. The definition of a layer is as described above.

Prototyping is focused on defining an interaction. That is, defining a combination of a trigger and a response is key. When a prototype assigned a defined interaction is actually implemented on a user interface screen, what a user recognizes will be a plurality of objects (not illustrated) displayed in a specific screen area. However, in a prototyping process, a plurality of layers are set in order to implement the objects displayed in the specific screen area and are placed at different levels. At each level, a specific area may be set using a layer, and an element such as an image, a video or a graphic design, to which a trigger and a response to the trigger are applied, may be given to the specific area.

During a prototyping process by a producer, a plurality of layers may be set at a plurality of levels before interactions are defined. Of the set layers, meaningless layers not assigned an interaction may be deleted in an editing process by the producer. Even if the meaningless layers are not deleted, it does not make any difference in, for example, conducting a test using the prototyping result. Therefore, producers generally store prototypes without processing the prototypes. However, if a prototype is stored with all its unnecessary layers, the data volume of the prototype may be significantly increased, which eventually results in a waste of storage space of a prototyping device and a time delay in transmitting the prototype from the prototyping device to a prototype repository. This is because the data volume of a prototype is affected by layers or objects set by a producer.

For example, of a plurality of layers illustrated in FIG. 2, an interaction may be assigned only to the first layer 11, and the other layers 12 through 16 may have nothing but themselves, or only objects not assigned an interaction may be set in the layers 12 through 16. In this case, only the first layer 11 assigned an interaction may be meaningful in the process of testing or demonstrating a prototype. However, although the layers 12 through 16 not assigned an interaction are meaningless layers that cannot be recognized by a user, they occupy a considerable portion of the data volume of the prototype. Therefore, if the layers 12 through 16 are merged into one layer, the data volume of the prototype can be reduced. A specific method of solving the above-mentioned problems and reducing the data volume of a prototype will hereinafter be described in detail.

Figure 3:
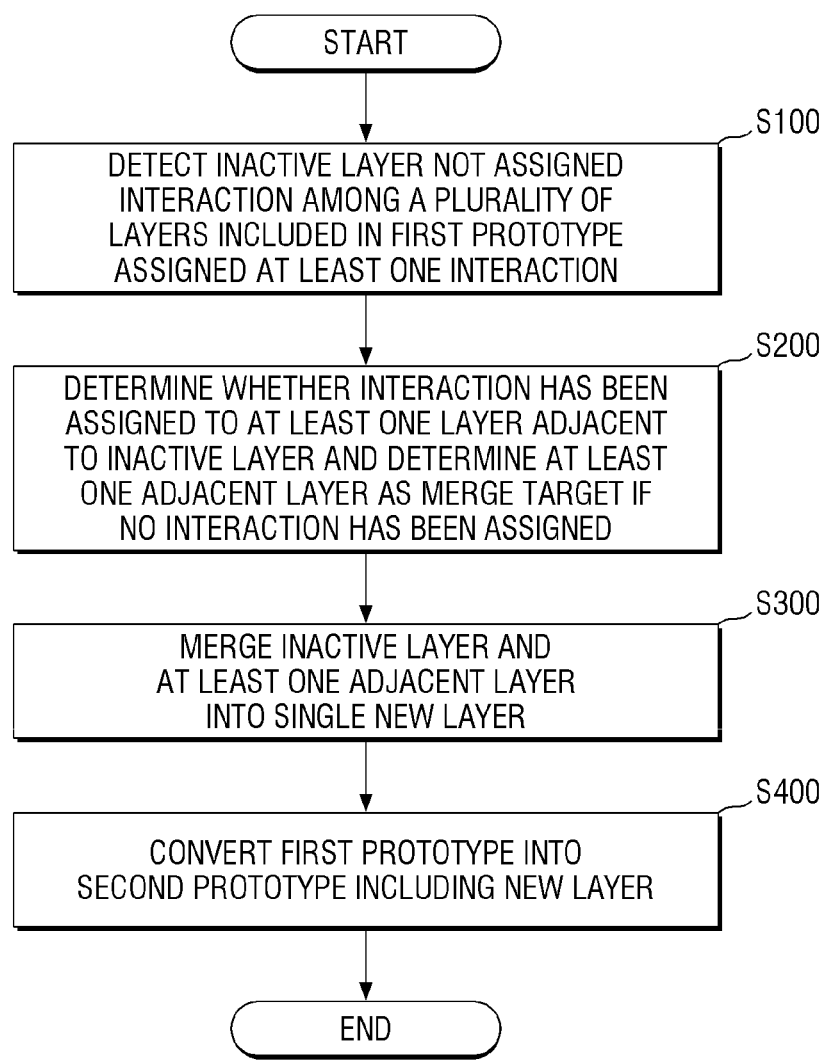
FIG. 3 is a flowchart illustrating a prototype storing method according to an embodiment.

FIG. 3 is a flowchart illustrating a prototype storing method according to an embodiment. However, this is merely an embodiment for achieving the objectives of the present disclosure, and some operations can be added or deleted as needed.

In operation S100, an inactive layer not assigned an interaction is detected among a plurality of layers included in a first prototype assigned at least one interaction. The inactive layer may be a layer having no object or a meaningless layer having an object not assigned an interaction among a plurality of layers set by a producer. In contrast, an active layer may be a layer in which an interaction has been assigned to an object set in the layer by a producer or to an object other than the object. Of a plurality of layers existing at different levels, a layer to which at least one interaction has not been assigned may be detected.

In operation S200, it is determined whether an interaction has been assigned to at least one layer adjacent to the detected inactive layer. If it is determined that no interaction has been assigned to the at least one adjacent layer, the at least one adjacent layer may be determined as a merge target. Specifically, any one of inactive layers located above and under the detected inactive layer may be determined as a merge target. In addition to the adjacent inactive layer, another inactive layer adjacent to the adjacent inactive layer may be detected and determined as a merge target.

Figure 4:
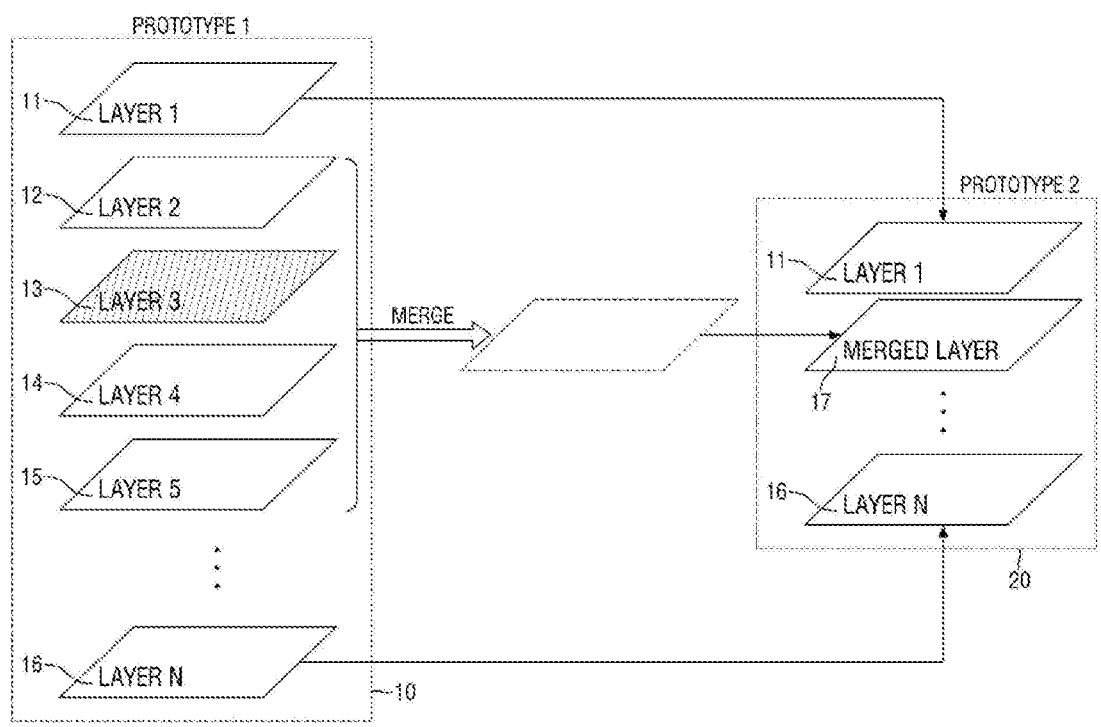
FIG. 4 is a conceptual diagram for explaining a process in which some of a plurality of layers are merged in the method of FIG. 3.

Operation S200 will now be described in more detail with reference to FIG. 4. Referring to FIG. 4, a first prototype 10 may be composed of a plurality of layers including a first layer 11, a second layer 12, a third layer 13, a fourth layer 14, a fifth layer 15, and an $N^{th}$ layer 16. Here, it is assumed that no interaction has been assigned to the third layer 13 as a result of detecting whether an interaction has been assigned to each layer. If the second layer 12 and the fourth layer 14 respectively located above and under the third layer 13 are inactive layers, the second layer 12, the third layer 13 and the fourth layer 14 can be merged (not illustrated). In addition, the fifth layer 15 located one layer under the third layer 13 can be determined as a merge target. Here, some of the merged layers may be generated as a new layer 17.

In some embodiments, a responsive layer may be automatically excluded from merge targets. The responsive layer can be understood as a layer whose layout is adjusted according to, e.g., a prototype execution environment. When the 'layout is adjusted,' it means that at least one of the arrangement and size of at least some objects included in a layer is changed. The responsive layer is included in a prototype in a state where its layout has been adjusted without a trigger, unlike a general layer in which a screen change is rendered according to an interaction.

The layout of the responsive layer may be adjusted, for example, according to the display resolution of a prototype execution terminal, the display size (i.e., the number of inches of the screen) of the prototype execution terminal, according to the prototype execution time, according to the prototype execution position, according to the login user of the prototype execution terminal, according to the weather at the time of prototype execution, according to the type of a network to which the prototype execution terminal is connected, according to the manufacturer of the prototype execution terminal, or according to the type of the prototype execution terminal (e.g., a smartphone or a tablet). The above examples are merely various examples used to explain the concept of the responsive layer, and the 'responsive layer' in this specification can be understood as all forms of layers whose layout is adjusted according to a certain criterion in addition to the above examples.

According to the current embodiment, a layer determined to be the responsive layer cannot be determined as a merge target even if no interaction has been assigned to the layer. Whether a layer is the responsive layer may be identified using an attribute value of the layer. The responsive layer can also not be selected as an inactive layer. If the responsive layer is merged with another layer simply because no interaction has been assigned to the responsive layer, a layout adjustment function that reflects the prototype execution environment may not work properly. To prevent this problem, the responsive layer may be excluded from merge targets even if no interaction has been assigned to the responsive layer.

In operation S300, one inactive layer and at least one inactive layer adjacent to the inactive layer are merged to generate a single new layer. By merging adjacent inactive layers to which no interaction has been assigned, it is possible to reduce the data volume of a prototype including unnecessary layers. In this case, a new layer may be generated by merging only inactive layers without an interaction. However, it should be noted that inactive layers are not the only layers to be merged. For example, if an object included in an inactive layer adjacent to one active layer to which an interaction has been assigned does not collide with an object included in the active layer, the active layer and the inactive layer can be merged.

Operation S300 will now be described in more detail with reference to FIG. 5. A merge process referred to in some embodiments refers to a logic for integrating a number of objects existing in different layers of planes into one layer area in one plane. Of a plurality of layers, a layer whose layer area is relatively small may be integrated into a layer whose layer area is large. In addition, if different objects are set in the layers, respectively, they may all be displayed on one layer plane.

Figure 5:
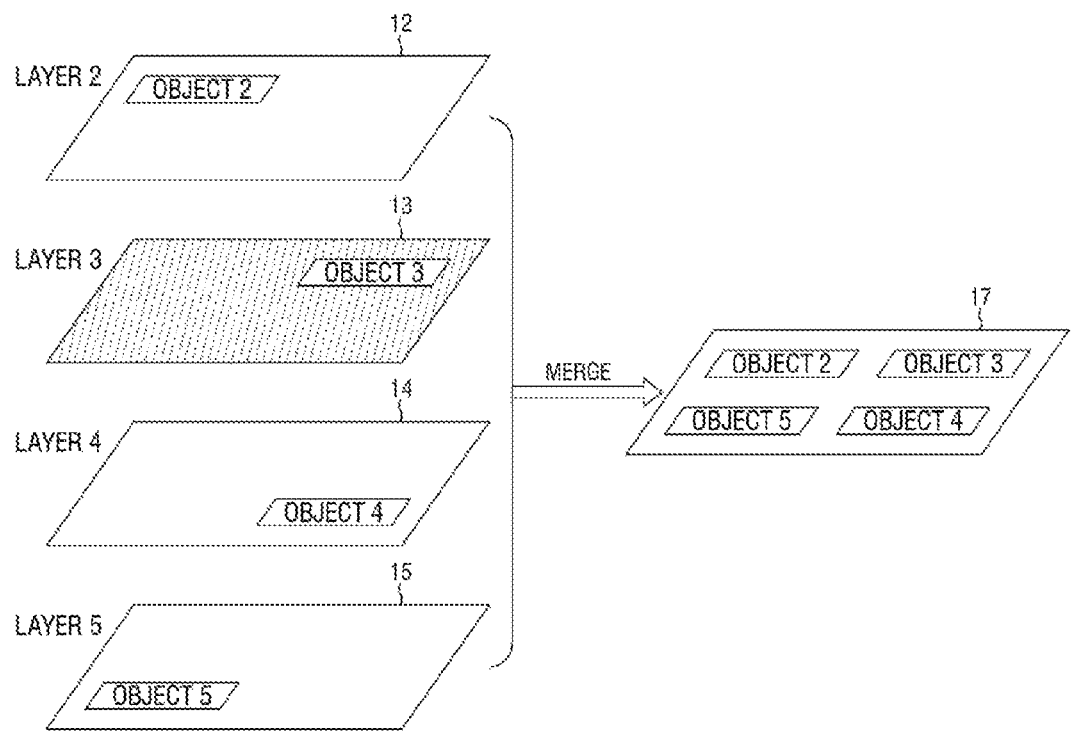
FIG. 5 is a conceptual diagram for explaining the concept of a new layer in the method of FIG. 3.

Referring to FIG. 5, a second layer 12, a third layer 13, a fourth layer 14 and a fifth layer 15 are merged into a new layer 17. An object is set in an area of each of the second through fifth layers 12 through 15, and it is detected as a result of performing operation S200 that no interaction has been assigned to each of the second through fifth layers 12 through 15. Then, the second through fifth layers 12 through 15 may be merged. The new layer 17 may be generated as the merge result, and the object set in each layer area may be integrated into one layer area of the new layer 17.

Meanwhile, if the following object is set in at least any one of layers, caution is required in a merge process. For example, this may be a case where a set object is an active object (such as a moving image, a web view or an animated graphic interchange format (GIF)) in which a response to a trigger has not been implemented (that is, to which no interaction has been assigned) but which provides dynamic content. Therefore, it is necessary to prevent a layer in which the active object is set and an adjacent layer from being merged with each other.

In an embodiment, the determining of whether the interaction has been assigned to the at least one layer adjacent to the detected inactive layer and determining the at least one adjacent layer as the merge target if it is determined that no interaction has been assigned to the at least one adjacent layer may include excluding the at least one adjacent layer from merge targets if an active object is set in the at least one adjacent layer. Therefore, only layers in each of which an object not assigned an interaction is set may be merged.

Unlike in the above case, it is assumed that an object assigned an interaction is detected in the area of the third layer 13. In this case, if objects are set in the areas of the second layer 12 and the fourth layer 14 adjacent to the third layer 13 and in the area of the fifth layer 15 adjacent to the fourth layer 14, but no interaction is assigned to the objects, all the layers may be merged unless the positions of the objects in the layer areas collide with each other while the interaction assigned to the third layer 13 is maintained.

In an embodiment, the determining of the at least one adjacent layer as the merge target may include setting a layer adjacent to any one inactive layer in any one of a first direction and a second direction opposite to the first direction as a reference layer if it is determined, as a result of determining whether an interaction has been assigned to each layer, that an interaction has been assigned to an object of the layer adjacent to the inactive layer and determining a layer, which is adjacent to the reference layer in at least any one of the first direction and the second direction and to which no interaction has been assigned, as a merge target. The generating of the single new layer may include merging layers including the reference layer. Here, the first direction may be an upward direction or a downward direction, and the second direction may be a direction opposite to the first direction.

In operation S400, the first prototype is converted into a second prototype including the new layer generated in operation S300. The first prototype refers to data including all of the meaningless layers to which a producer did not assign an interaction in a prototyping process, and the second prototype refers to prototype data whose volume has been reduced as a result of merging at least some of the meaningless layers into a single new layer.

The prototype storing method according to the embodiment may include detecting an inactive layer not assigned an interaction among a plurality of layers included in a first prototype assigned at least one interaction, determining whether an interaction has been assigned to at least one layer adjacent to the inactive layer and determining the at least one adjacent layer as a merge target if it is determined that no interaction has been assigned to the at least one adjacent layer, merging the inactive layer and the at least one adjacent layer into a single new layer, and converting the first prototype into a second prototype including the new layer. In the current embodiment, inactive layers can be detected sequentially based on at least one layer to which no interaction has been assigned. This simplifies the process of merging inactive layers and makes it possible to produce an accurate merge result.

In an embodiment, the inactive layer not assigned an interaction may include at least one object, and the object may be without an interaction. Generally, an interaction is assigned to an object in a set layer area. In the current embodiment, the determination of whether an interaction has been assigned is limited to objects. Therefore, interaction detection can be performed efficiently just before a merge process.

In an embodiment, the determining of the at least one adjacent layer as the merge target may include receiving a user's container manipulation input using a computing device, wherein the container manipulation input is an input for grouping some of the layers, determining whether an interaction has been assigned to some of the grouped layers, and determining the some of the grouped layers as merge targets if it is determined that no interaction has been assigned to all of the some of the grouped layers. The container manipulation input referred to in the current embodiment is a function of grouping a plurality of layers to control the layers at a time or may be a function of creating a scroll or paging interaction. In this case, if a merge process is performed only on a plurality of layers grouped by a user, layers to be merged can be quickly detected.

The prototype storing method according to the embodiments described above with reference to FIGS. 3 through 5 is designed to store a generated prototype in a storage provided in a prototyping device or to effectively store and transmit the prototype by reducing the data of the prototype when transmitting the prototype from the prototyping device to a prototype repository. Operations optionally added to the above-described method in order to realize these effects will be described with reference to FIG. 6.

Figure 6:
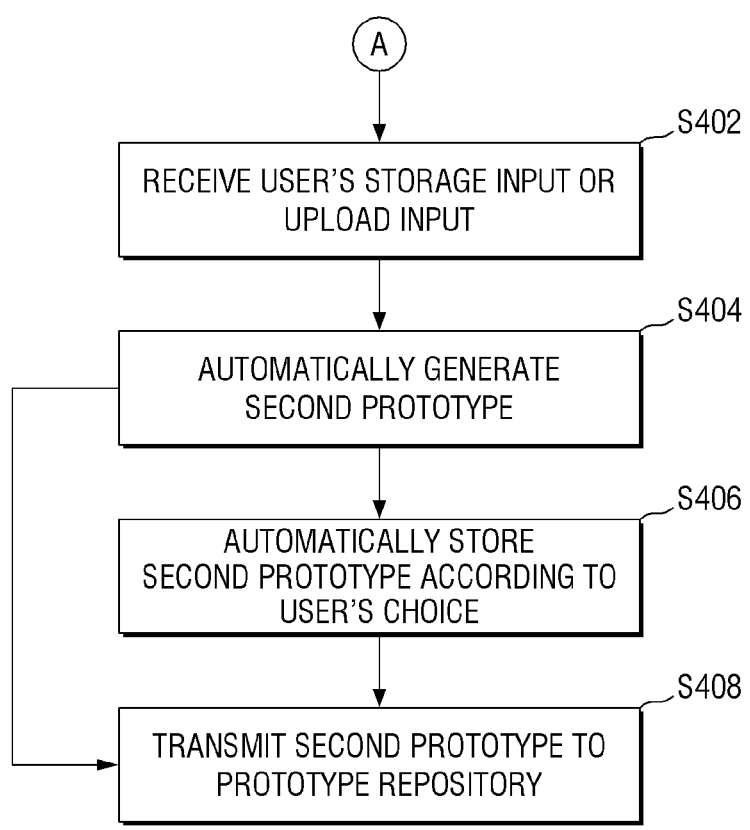
FIG. 6 is a detailed flowchart illustrating operations that are added to the prototype storing method of FIG. 3.

FIG. 6 is a detailed flowchart illustrating operations that can be added to the prototype storing method according to the embodiments. However, this is merely an embodiment for achieving the objectives of the present disclosure, and some operations can be added or deleted as needed.

In operation S402, a computing device receives a producer's storage input or upload input. The storage input or the upload input refers to a user input made by the producer to store a prototype in a storage provided in a prototyping device or to transmit the prototype to a prototype repository after generating the prototype.

In operation S404, a second prototype may be automatically generated in response to the user input. According to a conventional prototyping tool, when a prototype producer makes a storage input, the user input indicates the storage of a first prototype. However, in the current operation, even if the prototype producer intends the storage of the first prototype, the second prototype is automatically generated so that the second prototype with a reduced data volume can be stored.

In operation S406, when the second prototype is generated, it may be automatically stored in the storage of the prototyping device according to the user's choice. Although not illustrated in the flowchart of FIG. 6, the first prototype may also be stored when the second prototype is automatically stored.

In operation S408, the second prototype may be transmitted to the prototype repository. In this case, the second prototype may be transmitted without being stored in the storage of the prototyping device in operation S404 or may be transmitted after being stored in the storage.

In an embodiment, the converting of the first prototype into the second prototype including the new layer may include automatically converting the first prototype into the second prototype in response to the storage input or the upload input of the user of the computing device.

In an embodiment, the converting of the first prototype into the second prototype may include simultaneously storing the first prototype and the second prototype. According to the current embodiment, both the first prototype in which all layers are maintained and the second prototype with a reduce data volume may be stored. Therefore, the first prototype may be used to identify the work performed immediately before by the producer, and the second prototype generated by reducing the data volume of the prototype up to now may be transmitted to the prototype repository.

Meanwhile, an interaction may be assigned to at least two of different layers of a prototype. A prototype storing method according to an embodiment to be described below is designed to solve this problem.

Figure 7:
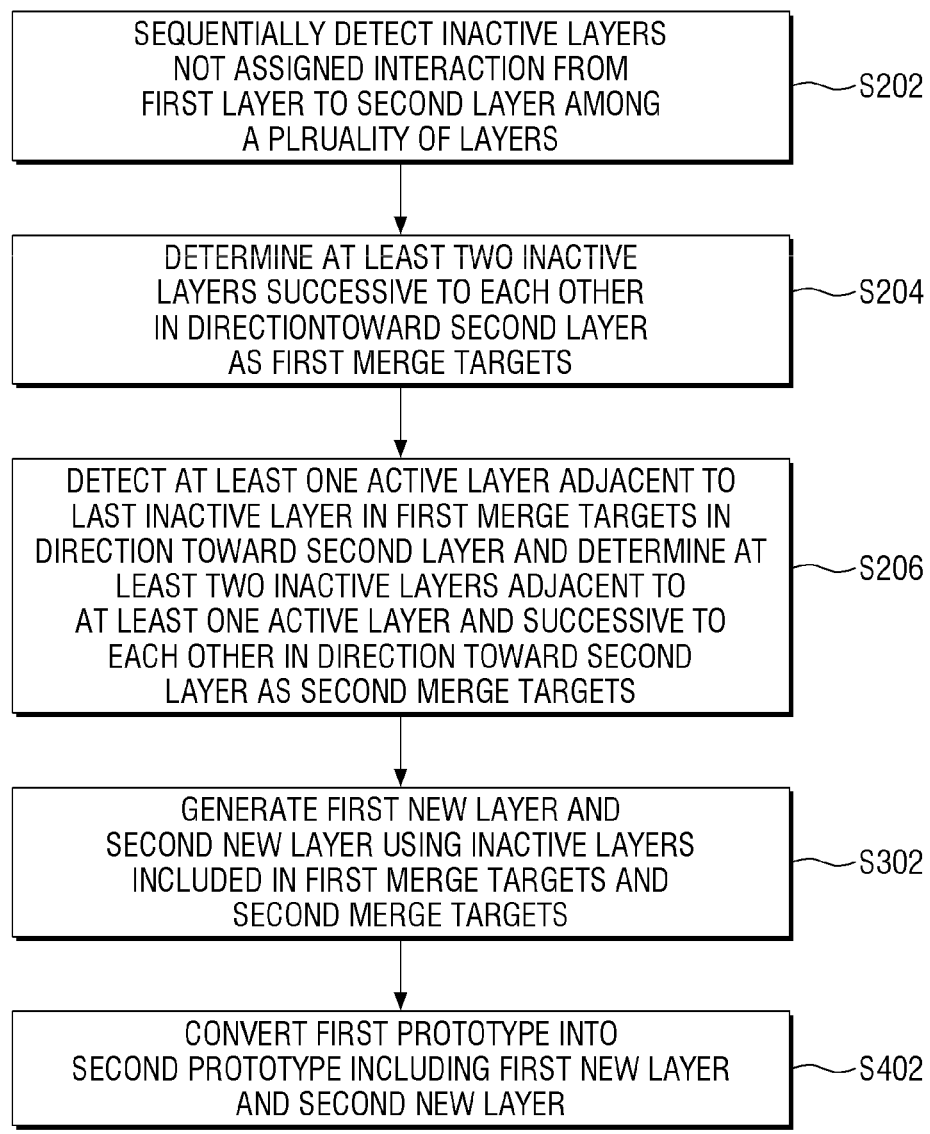
FIG. 7 is a flowchart illustrating a prototype storing method according to an embodiment.

FIG. 7 is a flowchart illustrating a prototype storing method according to an embodiment. However, this is merely an embodiment for achieving the objectives of the present disclosure, and some operations can be added or deleted as needed.

In operation S202, inactive layers not assigned an interaction are sequentially detected from a first layer to a second layer among a plurality of layers. Whether an interaction has been assigned to each of the layers can be accurately determined by sequentially detecting the layers. Here, the first layer and the second layer may respectively indicate a highest layer and a lowest layer among the layers or may indicate successive layers among all layers.

In operation S204, at least two inactive layers successive to each other in a direction toward the second layer are determined as first merge targets. Inactive layers may be sequentially detected, and the merge target determination logic in operation S200 of FIG. 3 may be applied.

In operation S206, at least one active layer adjacent to a last inactive layer among the first merge targets in the direction toward the second layer is detected, and at least two inactive layers adjacent to the at least one active layer and successive to each other in the direction toward the second layer are determined as second merge targets. This is a logic developed from operation S200 of FIG. 3. Since this logic determines two or more merge targets, it is applicable when there are multiple layers to which an interaction has been assigned.

In operation S302, a first new layer and a second new layer are generated using the inactive layers included in the first merge targets and the second merge targets determined in operations S204 and S206.

In operation S402, a first prototype is converted into a second prototype including the first new layer and the second new layer generated in operation S302.

In order to more specifically describe the flowchart of FIG. 7, the prototype storing method according to the current embodiment will now be described in detail using an example with reference to FIG. 8.

Figure 8:
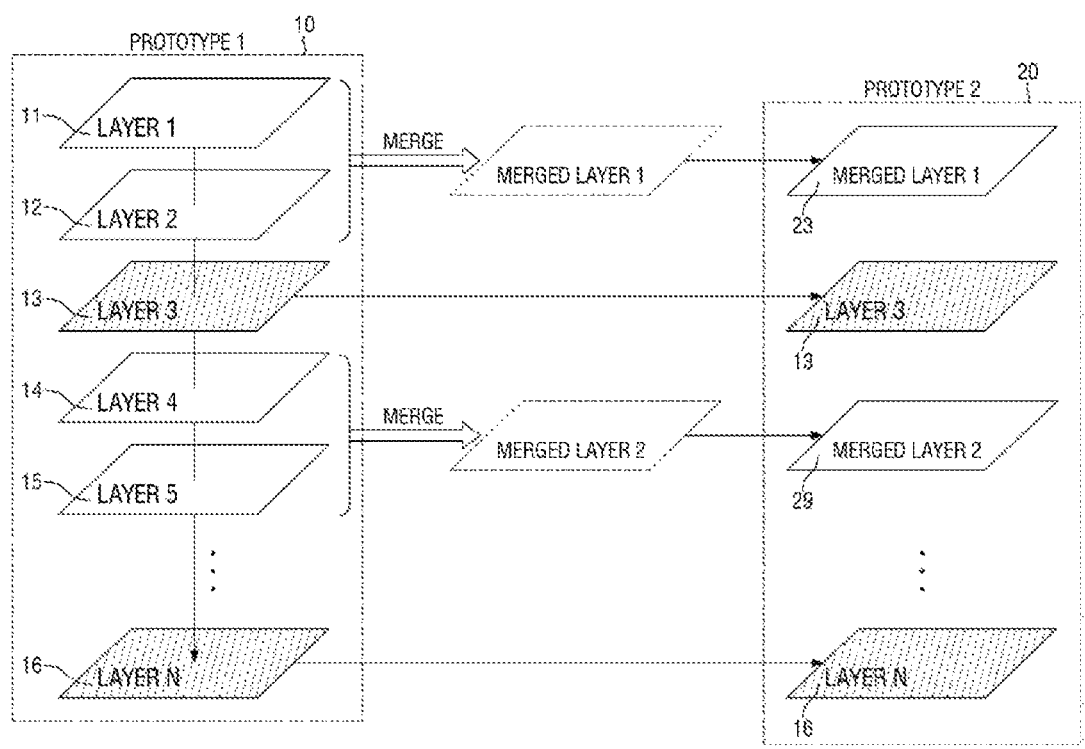
FIG. 8 is a conceptual diagram for explaining the concept of a plurality of new layers generated as a result of a merge process in the method of FIG. 7.

Referring to FIG. 8, a first prototype 10 may be composed of a plurality of layers including a first layer 11, a second layer 12, a third layer 13, a fourth layer 14, a fifth layer 15, and an $N^{th}$ layer 16. Whether an interaction has been assigned to each of the layers is detected sequentially from the first layer 11 to the $N^{th}$ layer 16.

If it is determined, as a result of sequentially detecting whether an interaction has been assigned to each of the layers, that no interaction has been assigned to the first layer 11 and the second layer 12, the first layer 11 and the second layer 12 may be determined as first merge targets. After the first merge targets are determined, it is determined whether an interaction has been assigned to the third layer 13 located under the second layer 12. If it is determined that an interaction has been assigned to the third layer 13, the fourth layer 14 and the fifth layer 15 located under the third layer 13 may be determined as second merge targets.

The first layer 11 and the second layer 12 included in the first merge targets are merged into a first new layer 23, and the fourth layer 14 and the fifth layer 15 included in the second merge targets are merged into a second new layer 29.

Finally, the first prototype 10 may be converted into a second prototype 20 using the first new layer 23, the second new layer 29, the third layer 13 to which an interaction has been assigned, and the $N^{th}$ layer 16.

In an embodiment, the determining of the at least one adjacent layer as the merge target may include sequentially detecting inactive layers not assigned an interaction from a first layer to a second layer among the layers, determining at least two inactive layers successive to each other in a direction toward the second layer as first merge targets, and detecting at least one active layer which is adjacent to a last inactive layer among the first merge targets in the direction toward the second layer and to which an interaction has been assigned and determining at least two inactive layers adjacent to the at least one active layer and successive to each other in the direction toward the second layer as second merge targets. The generating of the single new layer may include generating a first new layer and a second new layer using the inactive layers included in the first merge targets and the second merge targets, and the converting of the first prototype into the second prototype including the new layer may include converting the first prototype into the second prototype including the first new layer and the second new layer.

Meanwhile, an interaction in which a reorder response, which is one of the special functions of a prototyping tool that performs some embodiments, is generated may be assigned to a layer. The concept of the reorder response will now be described with reference to FIG. 9.

Figure 9:
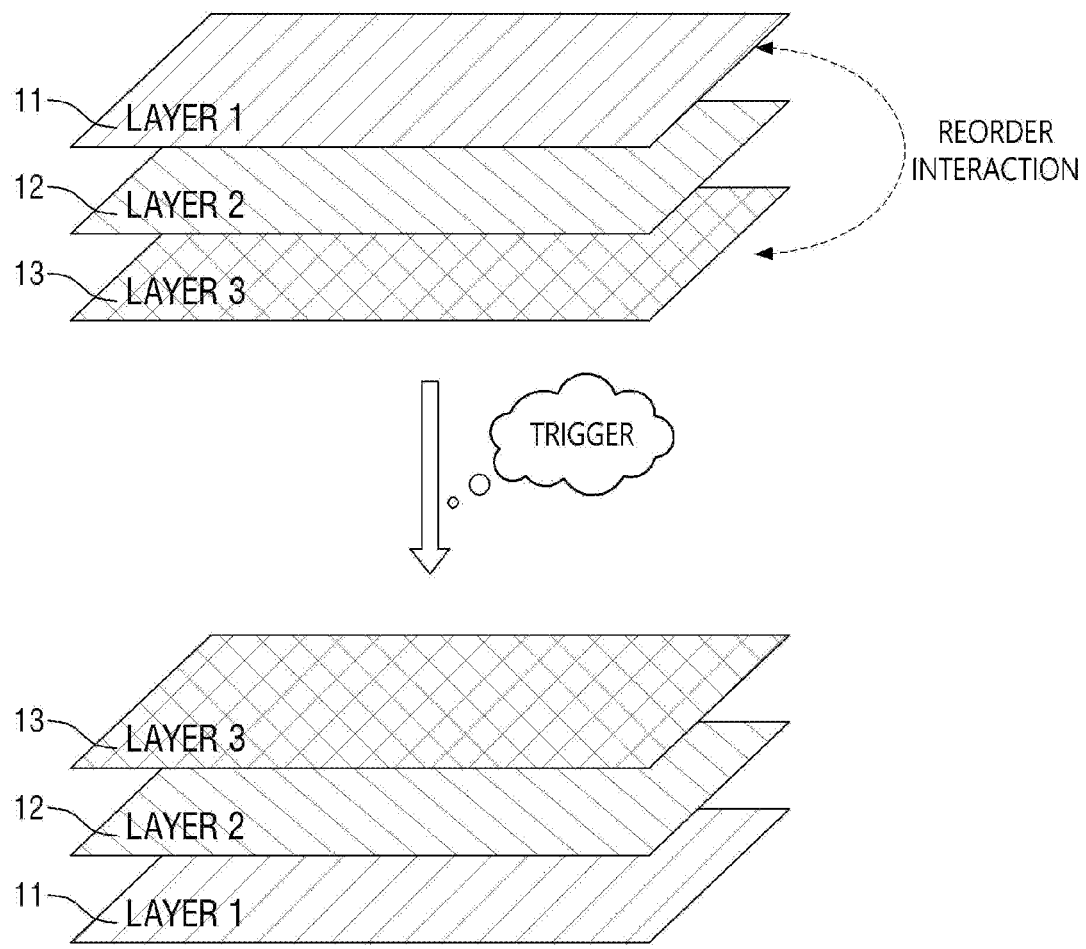
FIG. 9 is a conceptual diagram for explaining a reorder response referred to in a method to be described in FIG. 10.

Referring to FIG. 9, a plurality of layers include a first layer 11, a second layer 12, and a third layer. Here, a reorder response may change the order of layer positions when a specific trigger is input. For example, when a specific trigger is input to the first layer 11, the position of the first layer 11 is swapped with that of the third layer 13. From the perspective of the first layer 11, the third layer 13 to which the first layer 11 is to be moved may be defined as a target layer. In this case, if the target layer is merged with an adjacent layer (e.g., the second layer 12), the first layer 11 cannot be moved to the position of the target layer. Operations to be described below with reference to FIG. 10 are designed to solve this problem.

Figure 10:
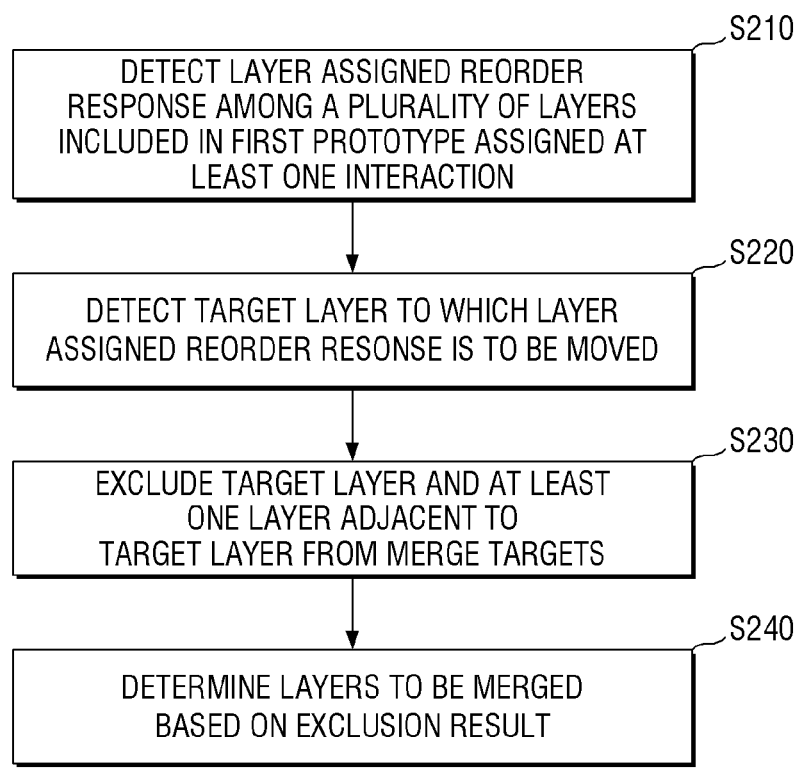
FIG. 10 is a flowchart illustrating a prototype storing method according to an embodiment, in which some of a plurality of layers are merged when a reorder response can be performed in a prototype.

FIG. 10 is a flowchart illustrating a prototype storing method according to an embodiment, in which some of a plurality of layers are merged when a reorder response can be performed in a prototype. However, this is merely an embodiment for achieving the objectives of the present disclosure, and some operations can be added or deleted as needed.

In operation S210, a layer assigned a reorder response is detected among a plurality layers included in a first prototype assigned at least one interaction. The reorder response is for swapping positions of at least two layers and essentially involves a target layer.

In operation S220, a target layer to which the layer assigned the reorder response is to be moved is detected. Swapping the position of the layer assigned the reorder response with that of the target layer in response to a trigger input is as described above with reference to FIG. 9.

In operation S230, the target layer and at least one layer adjacent to the target layer are excluded from merge targets. This is to secure the target layer to which the layer assigned the reorder response is to be moved.

In operation S240, layers to be merged are determined based on the exclusion result. The details of the process of determining merge targets can be found in operation S200 of FIG. 3 and operations S202 through S206 of FIG. 7.

Figure 11:
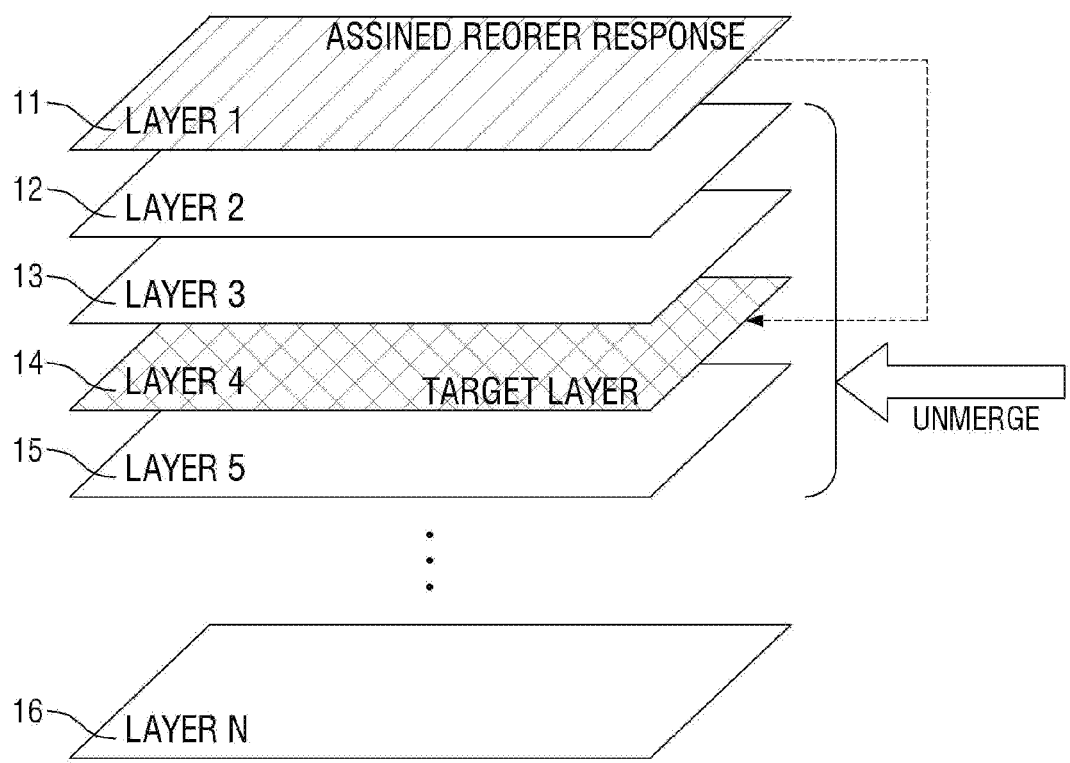
FIG. 11 is a conceptual diagram for explaining a process of determining whether to merge some of a plurality of layers in the method of FIG. 10.

In order to more specifically describe the flowchart of FIG. 10, a merging method in a case where a reorder response is assigned to a layer will now be described with reference to FIG. 11. Referring to FIG. 11, a plurality of layers may include a first layer 11, a second layer 12, a third layer 13, a fourth layer 14, a fifth layer 15, and an $N^{th}$ layer 16. Here, it is assumed that a reorder response has been assigned to the first layer 11 and that an interaction in which positions of the first layer 11 and the fourth layer 14 are swapped has been assigned. In this case, in order for the first layer 11 to move to the position of the fourth layer 14 which is a target layer, the fourth layer 14 should not be allowed to be merged with the third layer 13 or the fifth layer 15 adjacent to the fourth layer 14 even if no other interaction has been assigned to the fourth layer 14. Therefore, it is necessary to prevent the third through fifth layers 13 through 15 from being merged or to unmerge the third through fifth layers 13 through 15 if merged.

The prototype storing method according to the embodiment may include detecting a layer assigned a reorder response among a plurality of layers included in a first prototype assigned at least one interaction, detecting a target layer to which the layer assigned the reorder response is to be moved, and excluding at least one layer adjacent to the target layer from merge targets.

In a first embodiment, at least two of the layers may be merged based on the result of excluding the at least one adjacent layer from the merge targets. The merging of the at least two of the layers may include detecting an inactive layer not assigned an interaction among the layers included in the first prototype assigned the at least one interaction, determining whether an interaction has been assigned to at least one layer adjacent to the inactive layer and determining the at least one adjacent layer as a merge target if it is determined that no interaction has been assigned to the at least one adjacent layer, and generating a single new layer by merging the inactive layer and the at least one adjacent layer.

In a second embodiment, the determining of the at least one adjacent layer as the merge target in operation S200 of FIG. 3 may include detecting whether an interaction for generating a reorder response has been assigned to at least one of the layers, and the generating of the single new layer may include unmerging the generated new layer if a target layer, to which the at least one layer assigned the interaction is to be moved according to the reorder response, is included in the new layer. In the first embodiment, a merge process is performed after a target layer or a layer adjacent to the target layer is excluded from merge targets. On the other hand, in the second embodiments, if the target layer is merged with another layer, they are unmerged to maintain a reorder response.

Figure 12:
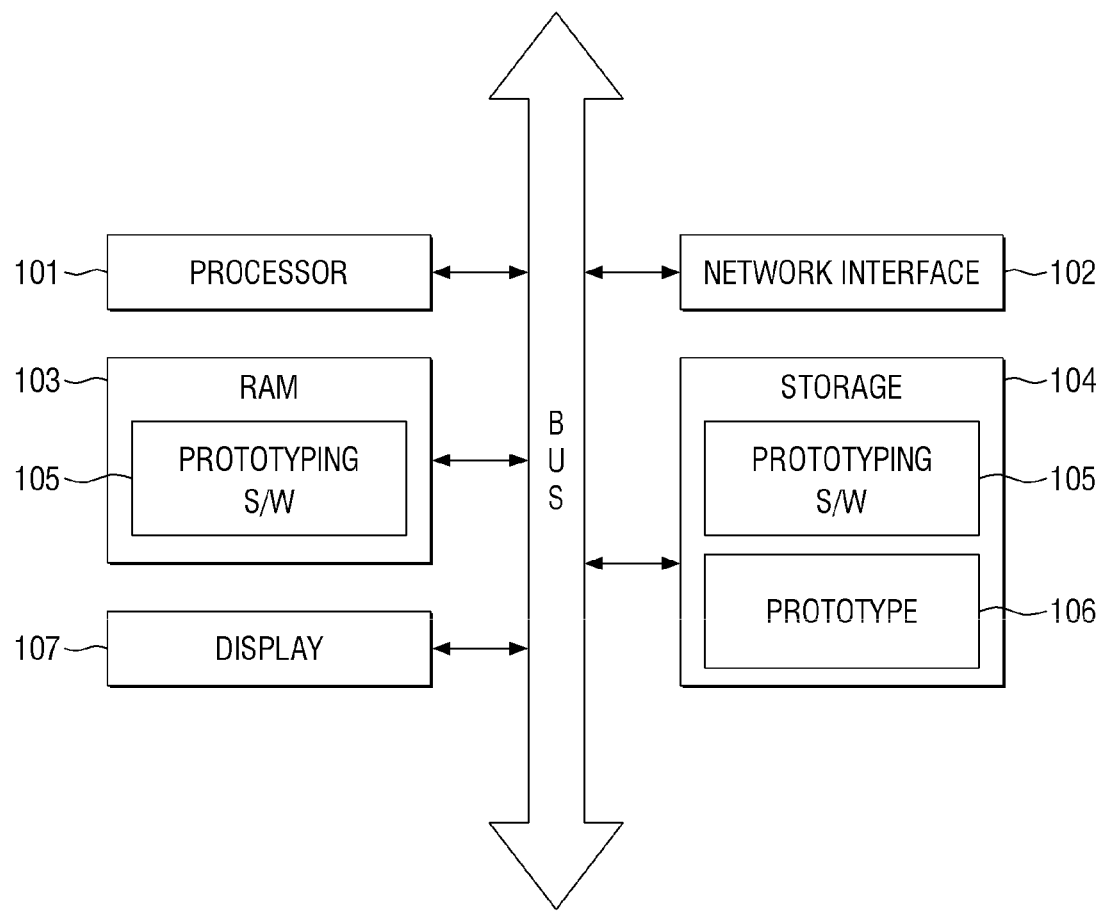
FIG. 12 is a block diagram of a prototyping device according to an embodiment.

Lastly, a prototyping device will be described in detail with reference to FIG. 12. FIG. 12 is a block diagram of a prototyping device according to an embodiment.

Referring to FIG. 12, a prototyping terminal 100 may include a processor 101, a network interface 102, a memory 103, a storage 104, and a display 107. Although not illustrated in the drawing, the prototyping terminal 100 may include an input unit used to receive various inputs from a user of the prototyping terminal 100.

The processor 101 controls the overall operation of each element of the prototyping terminal 100. The processor 101 may include a central processing unit (CPU), a microprocessor unit (MPU), a micro-controller unit (MCU), or any form of processor well known in the art to which the present disclosure pertains. In addition, the processor 101 may perform an operation on at least one application or program for executing methods according to embodiments. The prototyping terminal 100 may include one or more processors.

The network interface 102 supports wired and wireless Internet communication of the prototyping terminal 100. In addition, the network interface 102 may support various communication methods as well as Internet communication. To this end, the network interface 102 may include various communication modules.

The network interface 102 may transmit a generated prototype of an interface to an execution terminal 200 through the Internet. In this case, the execution terminal 200 may display the received prototype and objects of the displayed prototype. When the state of an object displayed is changed, the execution terminal 200 may also change the display state of another object.

In addition, according to an embodiment, the network interface 102 may provide the execution terminal 200 with access to the prototyping terminal 100 so that a prototype can be executed on the execution terminal 200. In this case, the execution terminal 200 may access the prototyping terminal 100 and execute a generated prototype. The memory 103 stores various data, commands and/or information.

To execute methods of prototyping an interface according to embodiments, the memory 103 may load one or more programs 105 from the storage 104. In FIG. 12, a random access memory (RAM) is illustrated as an example of the memory 103.

The storage 104 may non-temporarily store data received from an external device 300. The storage 140 may include a nonvolatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The storage 104 may store one or more programs 105 for executing methods according to embodiments. In FIG. 3, prototyping software is illustrated as an example of the programs 105.

The storage 104 may receive inputs and various settings needed to generate a prototype from the execution terminal 200 or from the user of the prototyping terminal 100 and store the received inputs and settings. In addition, the storage 104 may store a trigger module which is referred to in some embodiments.

The display 107 displays various data, commands and/or information of the prototyping terminal 100. In particular, the display 107 may be configured as a touchscreen having a touch sensor. When a prototyping program is executed on the prototyping terminal 100, the display 107 may display a prototyping interface.

According to an embodiment, the display 107 may display one or more objects and a change in the display states of the objects on an area of the prototyping interface.

In this case, when the display state of one object on the display 107 is changed, the processor 101 may detect the change and determine whether there is a trigger setting for the detected change. If the trigger setting for the change exists, the processor 101 may control the display state of another object to be changed according to the trigger setting. The display 107 may also display the change in the display state of the another object.

The input unit may receive, from a user, an input for setting a change in a reference attribute of an object as a trigger for changing the display state of another object. If the input is received from the execution terminal 200, it may be received through the network interface 102 as described above.

While the configuration and operation of the prototyping terminal 100 have been mainly described above, the above embodiment may be applied the same to the execution terminal 200 if the execution terminal 200 executes a prototyping method according to an embodiment. That is, an embodiment related to the execution of a prototype in the above description of the prototyping terminal 100 may be applied the same to the execution terminal 200. In addition, the execution terminal 200 may include each element of the prototyping terminal 100.

It has been assumed that methods according to embodiments are performed by the prototyping device described above.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A prototype storing method executed by a computing device, the method comprising:
    selecting an inactive layer not assigned an interaction from among a plurality of layers included in a first prototype assigned at least one interaction;
    determining a merge target from one or more layers adjacent to the inactive layer;
    generating a new layer by merging the inactive layer and the merge target; and
    generating a second prototype comprising the new layer in response to a user's input to the first prototype,
    wherein the determining of the merge target comprises detecting whether an interaction for generating a reorder response has been assigned to at least one layer of the plurality of layers,
    wherein the generating of the new layer comprises unmerging the generated new layer if a target layer is included in the new layer, and
    wherein the target layer is a layer to which the at least one layer is to be moved according to the reorder response.

2. The method of claim 1, wherein the generating of the new layer comprises integrating one or more objects existing in the inactive layer and the merge target into one layer area.

3. The method of claim 1, wherein the merge target is an inactive layer not assigned an interaction.

4. The method of claim 1, wherein the generating of the new layer comprises merging the inactive layer and an active layer adjacent to the inactive layer if an object included in the active layer does not collide with an object included in the inactive layer.

5. The method of claim 1, wherein the determining of the merge target comprises determining a responsive layer is not the merge target even if no interaction has been assigned to the responsive layer.

* * * * *